United States Patent
Armstrong

(10) Patent No.: US 8,085,516 B1
(45) Date of Patent: Dec. 27, 2011

(54) GROUND FAULT CIRCUIT INTERRUPTER WITH SELF TEST

(75) Inventor: Bruce G. Armstrong, San Mateo, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 616 days.

(21) Appl. No.: 12/171,924

(22) Filed: Jul. 11, 2008

(51) Int. Cl.
*H02H 3/00* (2006.01)
(52) U.S. Cl. .................................. 361/42; 361/45
(58) Field of Classification Search .............. 361/42, 361/45; 324/72
See application file for complete search history.

(56) References Cited

U.S. PATENT DOCUMENTS

| | | | |
|---|---|---|---|
| 3,878,435 A | 4/1975 | Van Zeeland et al. | |
| RE30,678 E | 7/1981 | Van Zeeland et al. | |
| 6,674,289 B2 | 1/2004 | Macbeth | |
| 6,873,158 B2 | 3/2005 | Macbeth | |
| 7,149,065 B2 * | 12/2006 | Baldwin et al. | 361/42 |
| 7,315,437 B2 * | 1/2008 | Bonilla et al. | 361/42 |
| 2007/0035898 A1 * | 2/2007 | Baldwin et al. | 361/42 |

OTHER PUBLICATIONS

RV4141A Low Power Ground Fault Interrupter, Jun. 2005, pp. 1-7, Fairchild Semiconductor Corporation.

* cited by examiner

*Primary Examiner* — Stephen W Jackson
*Assistant Examiner* — Angela Brooks
(74) *Attorney, Agent, or Firm* — Okamoto & Benedicto LLP

(57) ABSTRACT

A ground fault circuit interrupter (GFCI) includes a GFCI controller configured to detect for ground faults and to periodically perform a self test. The self test may be performed during a positive half cycle of an AC line voltage coupled to a load by the GFCI. The self test may include testing of a critical component of the GFCI without opening load contacts coupling the AC line voltage to the load. The self test may further include testing of monitoring coils in the GFCI.

20 Claims, 4 Drawing Sheets

GROUND FAULT CIRCUIT INTERRUPTER WITH SELF TEST

BACKGROUND OF THE INVENTION

1. Field of the Invention

The present invention relates generally to electrical safety devices, and more particularly but not exclusively to ground fault circuit interrupters.

2. Description of the Background Art

A ground fault circuit interrupter (GFCI) is an electrical device for interrupting electrical current flow upon detection of a hazardous current path to ground. GFCI's are typically employed in power outlet receptacles (e.g., 120V, 60 Hz) to prevent electrocution.

A GFCI typically includes a sense coil for sensing the difference between electrical current flowing through and returning to the GFCI. A current difference of zero indicates that all of the current is flowing to the load. A non-zero current difference indicates current leakage possibly caused by a ground fault. The sense coil senses this leakage current and provides corresponding information to a GFCI controller, such as the RV4141A integrated circuit (IC) device from Fairchild Semiconductor. In response to a ground fault, the GFCI controller generates a fault signal to turn ON a silicon controlled rectifier (SCR), which in turn energizes a solenoid to open load contacts and cut-off power to the load.

The Consumer Product Safety Commission recommends that GFCI's be tested on a monthly basis. GFCI manufacturers are thus required to include test and reset buttons for manually verifying proper operation of a GFCI device. Unfortunately, most GFCI's are not manually tested for functionality. Accordingly, there is a need for some form of GFCI self test.

One way of self testing a GFCI is to automatically trip the GFCI and then reset it. This approach is undesirable because it would cause temporary power loss, unexpectedly interrupting operation of electronic devices plugged into the power outlet receptacle (e.g., could cause data loss). Embodiments of the present invention pertain to a GFCI that allows for self testing of critical components without load power loss.

SUMMARY

A ground fault circuit interrupter (GFCI) may include a GFCI controller configured to detect for ground faults and to periodically perform a self test. The self test may be initiated during a positive half cycle of an AC line voltage coupled to a load by the GFCI. The self test may include testing of a critical component of the GFCI without opening load contacts coupling the AC line voltage to the load. The component may include a silicon controlled rectifier (SCR) configured to allow opening of the load contacts in an event of a ground fault during normal operation. For example, during the self test, the SCR may be turned ON without energizing a solenoid that controls the opening of the load contacts. The self test may further include testing of a sense coil configured to monitor current flow through the GFCI. For example, during the self test, the sense coil may be mutually coupled to another coil to create positive feedback and detect resulting oscillation in an amplifier.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
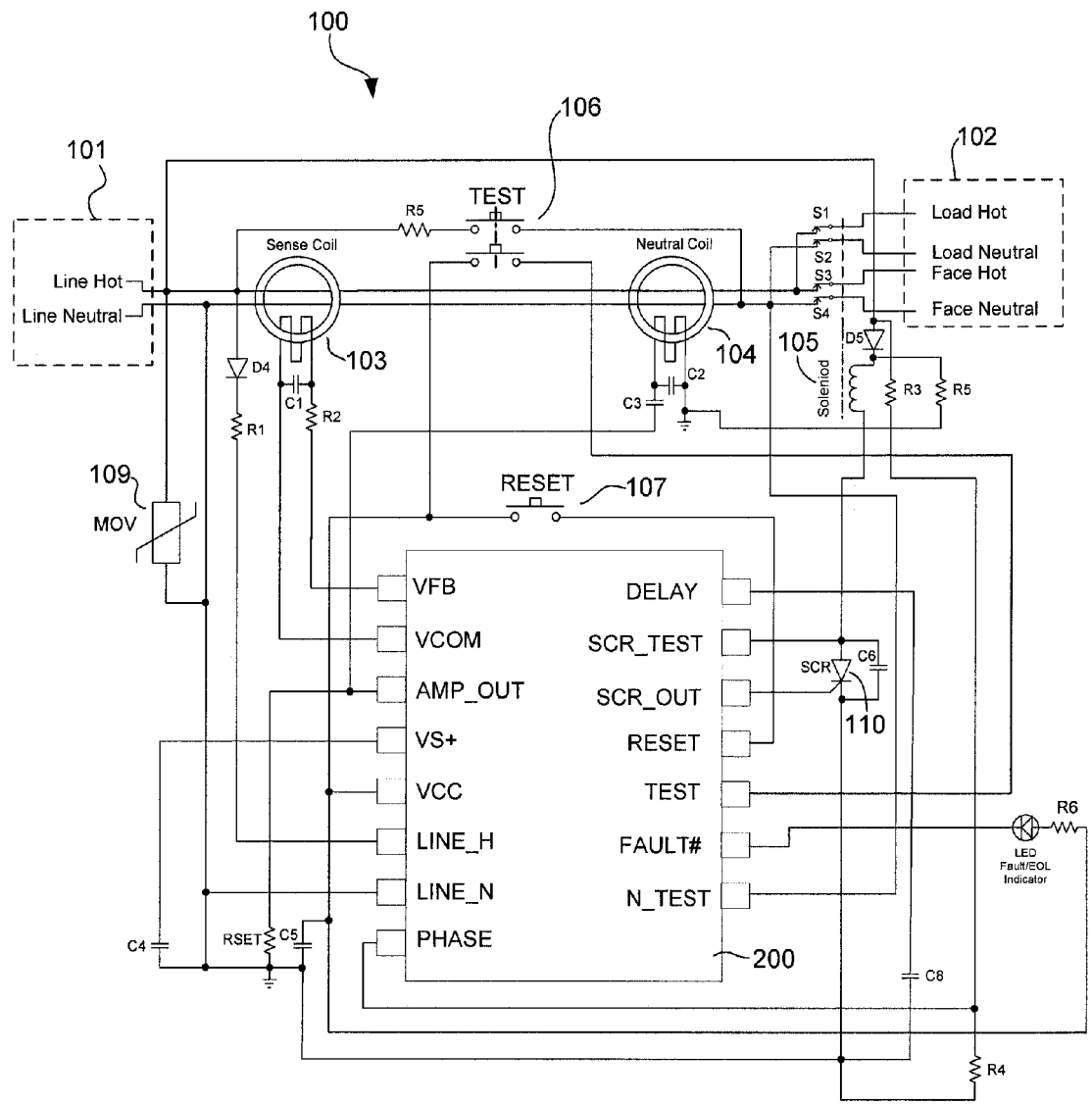
FIG. 1 schematically shows a GFCI in accordance with an embodiment of the present invention.

FIG. 1 schematically illustrates a GFCI 100 in accordance with an embodiment of the present invention. The GFCI 100 is configured to couple an alternating current (AC) line voltage on an AC line 101 to a load 102. A metal oxide varistor (MOV) 109 provides transient protection across the line 101.

As is conventional, the line 101 includes a line hot wire and a line neutral wire. The load 102 may be electrically connected to the line 101 by way of a power outlet receptacle, which electrically connects to the line 101 by way of a load hot wire, load neutral wire, face hot wire, and face neutral wire. The load hot, load neutral, face hot, and face neutral wires are coupled to the AC line 101 by way of switches S1-S4. The switches S1-S4 are also referred to as "load contacts."

As can be appreciated, the GFCI 100 may also be used to electrically connect other line and load configurations without detracting from the merits of the present invention.

The GFCI 100 may be configured to interrupt power output to the load 102 upon detection of a ground fault. In the example of FIG. 1, the GFCI 100 does so by energizing the solenoid 105 to open the switches S1-S4, thereby opening the load contacts and breaking the electrical connection between the line 101 and the load 102. A test switch 106 allows for manual testing of the GFCI 100 by simulating a ground fault, which should open the load contacts. Closing of the test switch 106 is detected by a control logic 201 (see FIG. 2) by way of a TEST pin of a GFCI controller 200. In that case, the control logic 201 checks to make sure closing the test switch 106 turns ON an SCR 110, verifying the functionality of the SCR 110. A reset switch 107 allows for placing the GFCI controller 200 back to normal mode of operation.

In the example of FIG. 1, the GFCI controller 200 controls the operation of the GFCI 100. The controller 200 detects ground fault conditions from sensed current information received from a sense coil 103. The sense coil 103 senses electrical current flow between the line 101 and the load 102, and provides the sensed current information to the controller 200. A capacitor C1 across the sense coil 103 improves noise immunity by forming a high frequency filter. A resistor R2 reduces DC offset at the output of a sense amplifier A1 in the GFCI controller 200 (see FIG. 2).

An electrical short between line neutral and load neutral, which is referred to as a "grounded neutral fault," mutually couples the sense coil 103 to the neutral coil 104. The mutual coupling of the sense coil 103 and the neutral coil 104 creates positive feedback in the amplifier A1 (see FIG. 2), resulting in oscillation that can be detected by a control logic 201 (see FIG. 2). In the event of a grounded neutral fault, the GFCI controller 200 turns ON the SCR 1110 to energize the solenoid 105 and open the switches S1-S4, and also turns ON a Fault/End Of Line (EOL) indicator LED to provide a visual indication of the grounded neutral fault.

A ground fault, in general, is an accidental and often hazardous, leakage current path to earth ground. This results in a difference between the current flowing through and returning to the GFCI 100. When the sensed current information from the sense coil 103 indicates a ground fault, the controller 200 turns ON the SCR 110 to energize the solenoid 105 and thereby open the switches S1-S4. This results in power loss to the load 102. In the event of a ground fault, the controller 200 also turns ON the Fault/EOL indicator LED to provide a visual indication of the ground fault. A resistor R6 limits current through the Fault/EOL indicator LED.

Advantageously, the GFCI controller 200 also includes provisions for periodically performing a self test. The controller 200 may be configured to perform the self test without energizing the solenoid that is configured to control the load contacts connecting the AC line to the load. This allows the self test to be performed without momentary power loss. The controller 200 may be configured to perform the self test without compromising normal ground fault detection.

In the example of FIG. 1, the GFCI controller 200 is configured to perform a functional self test without energizing the solenoid 105. In one embodiment, the controller 200 does so by initiating testing of the SCR 110 when the AC line voltage is low, near the end of its positive half cycle but before zero crossing. The controller 200 may also be configured to test the sense coil 103 and the neutral coil 104 as part of the self test. As can be appreciated, the SCR 110, sense coil 103, and neutral coil 104 are critical components of the GFCI 100. Therefore, periodic and automatic testing of the SCR 110, sense coil 103, and neutral coil 104 advantageously allow for self testing of most of the functionality of the GFCI 100.

Figure 2:
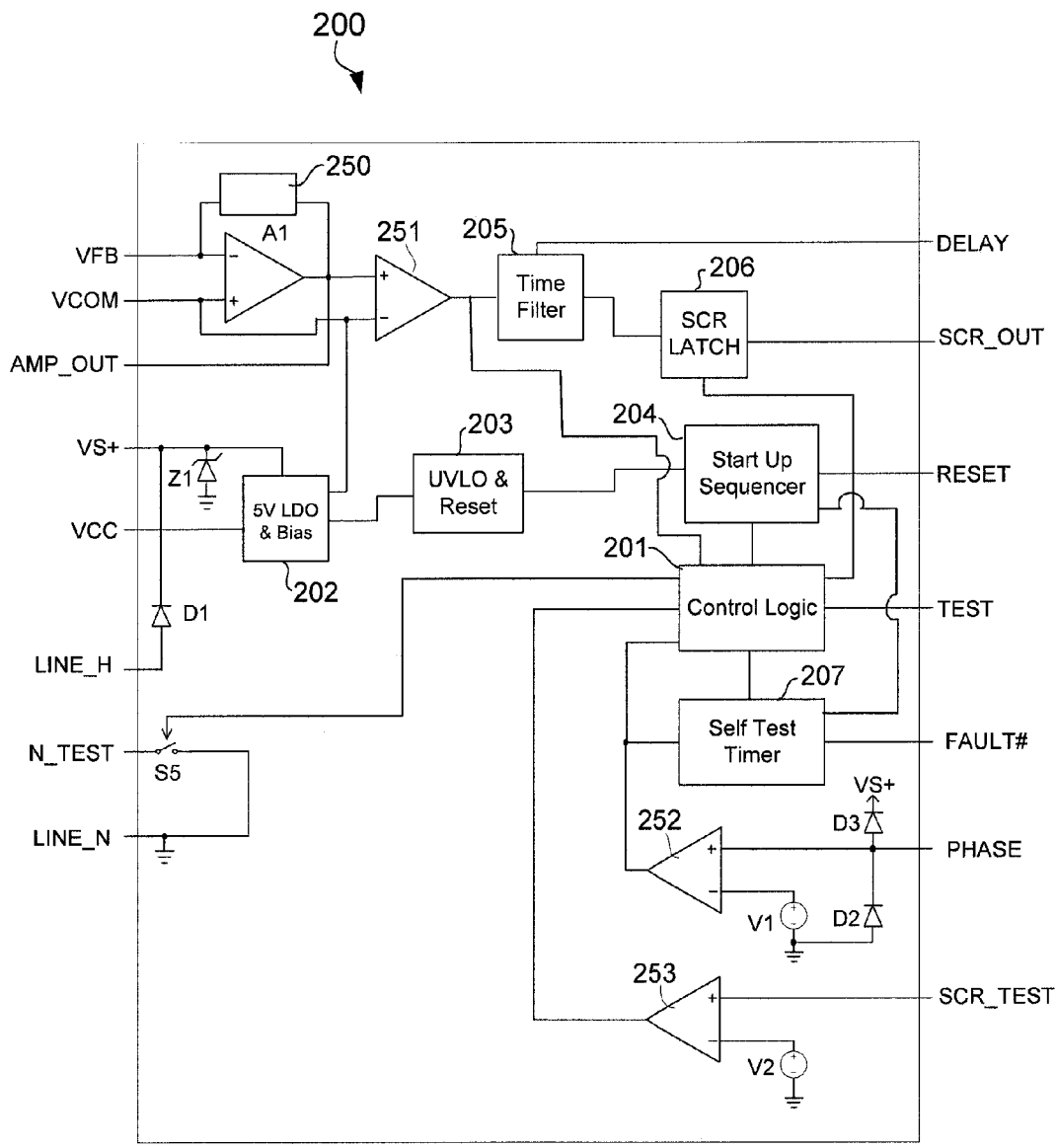
FIG. 2 schematically shows further details of a GFCI controller in the GFCI of FIG. 1, in accordance with an embodiment of the present invention.

FIG. 2 schematically shows further details of the GFCI controller 200 in accordance with an embodiment of the present invention. The GFCI controller 200 may be implemented using discrete components or as an integrated circuit. The pins of the controller 200 in FIGS. 1 and 2 are labeled the same to show how the controller 200 of FIG. 2 may be incorporated into the GFCI 100. The operation of the GFCI 100 is now discussed with reference to both FIGS. 1 and 2.

The AC line voltage is received in the GFCI controller 200 by way of the LINE_H and LINE_N pins. When the AC line voltage is first applied to the GFCI 100, a zener diode Z1 clamps the VS+ signal to a predetermined voltage (e.g., 30 volts) to supply power to a linear regulator 202, which in this example is a 5 volt low dropout voltage regulator (LDO). The regulator 202 is bypassed with a capacitor C5 and has suitable power supply rejection ratio to reject noise from the AC line voltage. A diode D1 is optional and may be used instead of a diode D4 in some applications.

At least in the United States, the voltage on the AC line 101 is a sinusoid with a frequency of 60 HZ. A diode D4 allows the capacitor C4 for the VS+ supply to be charged only during the positive half cycle of the AC line voltage. The series resistor R1 limits the maximum current when the regulator 202 clamps the AC line voltage. During the negative half cycle of the AC line voltage, the capacitor C4 supplies current for the regulator 202. The regulator 202 supplies bias for the analog and logic circuitry of the GFCI controller 200.

An under-voltage lockout (UVLO) and reset circuit 203 is configured to reset the GFCI controller 200 to a known state upon power up. When the voltage output of the regulator 202 exceeds the rising threshold (e.g., 4 volts for 5 volt digital logic) of the UVLO and reset circuit 203, the start up sequencer 204 will issue a reset signal to the control logic 201 and the self test timer 207. The start up sequencer 204 may also issue the reset signal to the control logic 201 and the self test timer 207 in response to receiving a manual reset from the reset switch 107 by way of the RESET pin.

The self test timer 207 may comprise logic circuitry for setting when to initiate the self test. For example, the self test timer 207 may be configured to periodically initiate a self test, such as every 24 hours. The self test timer 207 may be configured to send a start signal to the control logic 201 to initiate a self test.

The control logic 201 may be configured to initiate a self test cycle upon receipt of a reset signal from the start-up sequencer 204 or a start signal from the self test timer 207. In one embodiment, the self test cycle comprises a two-part test with the first part involving testing of the sense coil 103 and the neutral coil 104 and the second part involving testing of the SCR 110. This allows for automatic functional testing of the component that allows for opening of the load contacts in the event of a ground fault and the coils used to detect the ground fault.

To test the sense coil 103 and the neutral coil 104, the control logic 201 closes the switch S5. The switch S5 may comprise an NMOS transistor with a low Rdson resistance (e.g., <2Ω). Closing of the switch S5 creates an electrical short through the N_TEST and LINE_N pins, mutually coupling the sense coil 103 and the neutral coil 104 and creating a positive feedback loop around the amplifier A1. The positive feedback causes the amplifier A1 to oscillate at a frequency dependent on the capacitor C2 and the bandwidth of the amplifier A1. Because an actual ground fault can occur at any time, the self test cycle is preferably short enough so as not to interfere with the required UL943 maximum trip time specification of 25 ms for a high value ground fault. For a typical oscillation frequency of 10 KHz, the switch S5 only needs to be closed for 1 ms, which is well within UL (Underwriter Laboratories) requirements. During this time, the control logic 201 disables the SCR latch 206 and checks the output of the amplifier A1 to determine if it is oscillating. An oscillating amplifier A1 indicates that the sense coil 103 and neutral coil 104 are working properly. If the output of the amplifier A1 is not oscillating, the control logic 201 deems the sense coil 103, the neutral coil 104, or both to be defective, and accordingly illuminates the Fault/EOL indicator LED and turns ON the SCR 110. Turning ON the SCR 100 energizes the solenoid 105 to open the switches S1-S4, thereby disabling power to the load 102. Note that the self testing of the sense coil 103 and the neutral coil 104 does not involve opening of the switches S1-S4 unless, of course, at least one of the coils is found defective.

The control logic 201 proceeds to the second part of the self test when it deems that the sense coil 103 and the neutral coil 104 are working properly. In the second part of the test, the comparator 252 detects the phase angle of the AC line voltage. Resistors R3 and R4 create a voltage divider from the AC line voltage. The divided voltage appears on the PHASE pin of the controller 200 and is clamped (e.g., to −0.7 volt) by a diode D2 when the AC line voltage is in the negative half cycle and by a diode D3 when the AC line voltage is in the positive half cycle. The divided voltage may be clamped by the diode D3 to about 0.7 volt plus the voltage VS+, which is across the capacitor C4.

The output of the comparator 252 becomes a logical HIGH when the AC line voltage is in the positive half cycle and is above $V1*R4/(R3+R4)$, where V1 is a voltage source coupled to the negative input terminal of the comparator 252. By proper selection of the voltage V1, resistor R3 and resistor R4, the phase angle for the start and end of the positive half cycle of the AC line voltage can be detected. The control logic 201 turns ON the SCR 110 when the comparator 252 indicates that the AC line voltage is near the end of the positive half cycle (e.g., AC line voltage between 10V and zero), just before the AC line voltage becomes zero to start the negative half cycle. The SCR 110 will quickly discharge and the solenoid 105 will not have enough energy to open the switches S1-S4 because the AC line voltage is close to its zero crossing phase angle. This advantageously allows for self testing of the SCR 110 without energizing the solenoid 105, preventing temporary power loss during the self test.

The anode voltage of the SCR 110 is connected to a capacitor C6 and is in series with a diode D5 to the AC Line voltage. A resistor R5 discharges the capacitor C6 through the solenoid 105. The diode D5 blocks current flow during the negative half cycle of the AC line voltage so that the solenoid 105 cannot be energized at that time. During the start of the positive half cycle of the AC line voltage, the anode of the SCR 110 will charge up to a peak voltage (e.g., +170 volts) and discharge at a time constant determined by the capacitor C6 and the resistor R5. The values of the capacitor C6 and resistor R5 are selected such that the voltage on the anode of the SCR 110 can decay (e.g., to 20 to 30 volts) at the end of the positive half cycle.

The voltage on the anode of the SCR 110 is monitored by the comparator 253 through the SCR_TEST pin. The comparator 253 detects the anode voltage of the SCR 110 at the zero crossing phase angle. If the SCR 110 is working properly, the comparator 253 will detect a low voltage (e.g., less than 30 volts) on the anode of the SCR 110 at the zero crossing phase angle.

Figure 3:
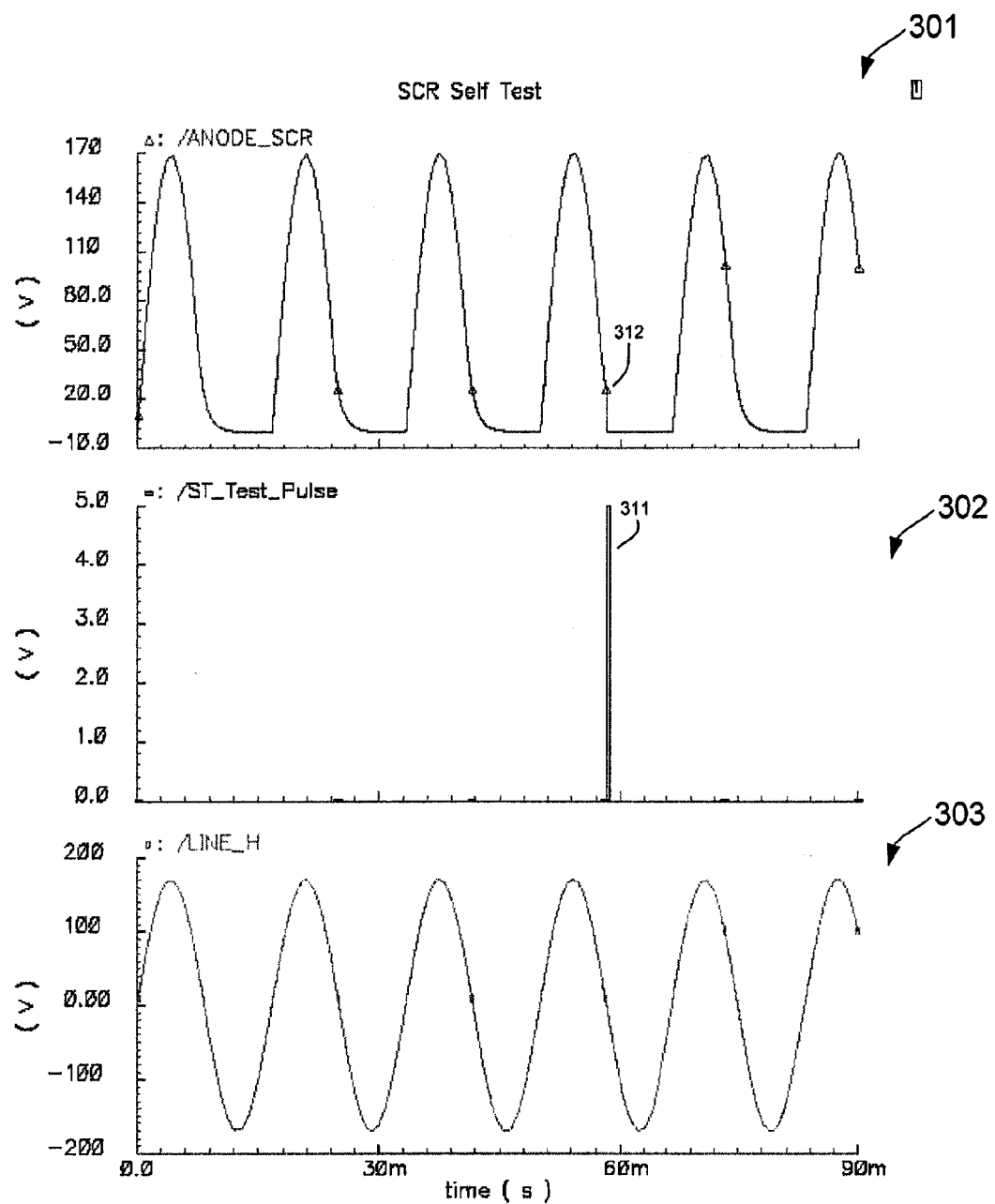
FIGS. 3 and 4 show simulation waveforms of a GFCI in accordance with an embodiment of the present invention.

FIG. 3 shows example simulation waveforms illustrating the functional testing of the SCR 110. In the example of FIG. 3, the waveform 301 shows the anode voltage of the SCR 110, waveform 302 shows the SCR test pulse generated by the control logic 201 to test the SCR 110, and waveform 303 shows the AC line voltage on the line 101. The horizontal and vertical axes show time in milliseconds and volts, respectively. The portion of the AC line voltage above zero volts is what is referred to as the "positive half cycle" and the portion of the AC line voltage below zero volts is what is referred to as the "negative half cycle." The crossing of the AC line voltage through zero volts is what is referred to as "zero crossing."

In the example of FIG. 3, the control logic 201 generates a 500 us SCR test pulse (see 311) near the end of the positive half cycle of the AC line voltage, at about 9 volts. This discharges the anode voltage of the SCR 110 from approximately 25 volts to zero (see 312) during the 500 us test pulse. The comparator 253 detects the anode voltage of the SCR 110 and compares it to an SCR test threshold voltage set by the voltage source V2 (FIG. 2). If the output of the comparator 253 indicates that the anode voltage of the SCR 110 has not discharged below the SCR test threshold voltage, the control logic 201 deems the SCR 110 to be faulty, and accordingly opens the load contacts and illuminates the Fault/EOL indicator LED.

Figure 4:
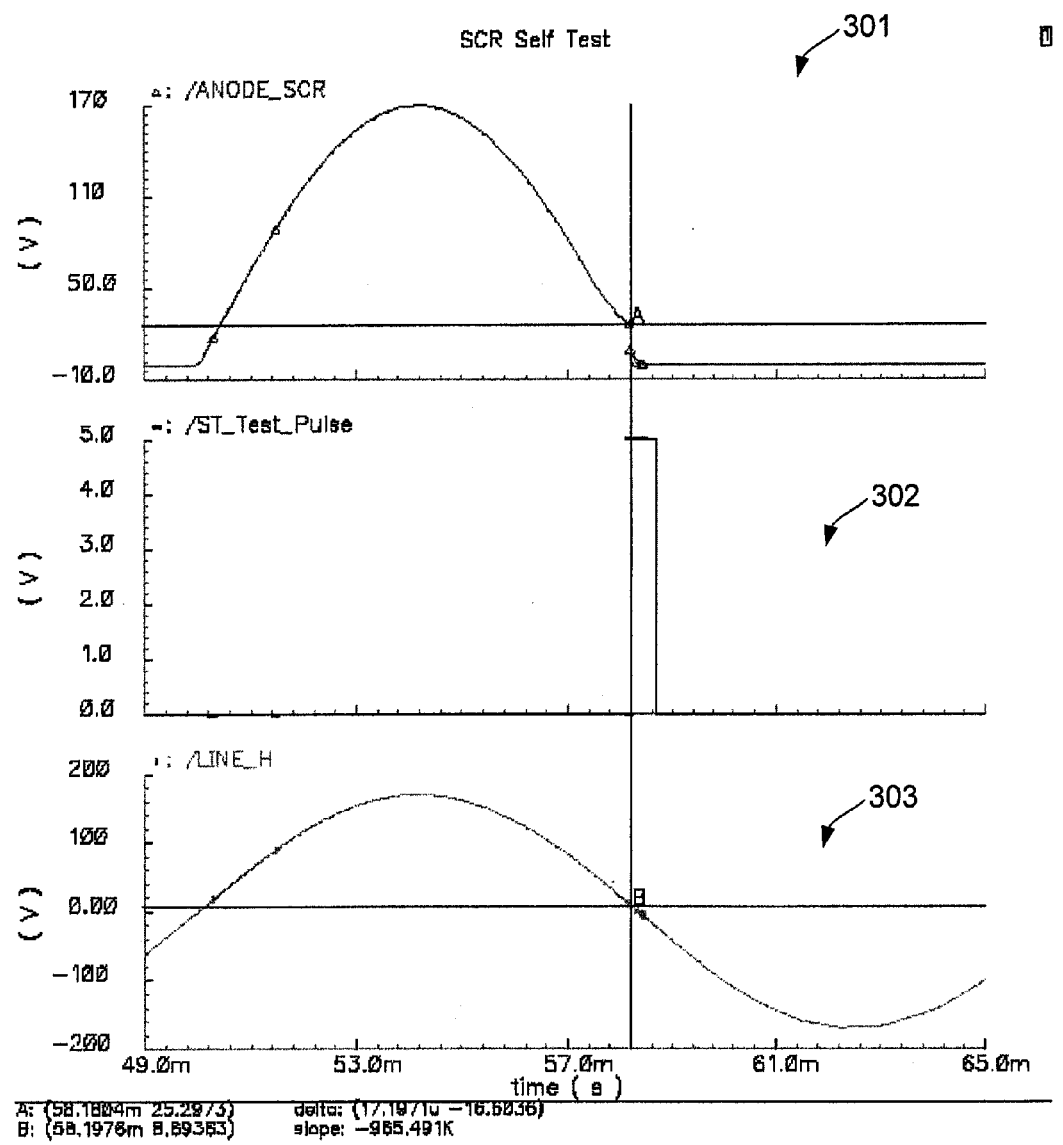

FIG. 4 shows a magnification of the waveforms 301, 302, and 303. The anode voltage of the SCR 110 is at about 25 volts and the AC line voltage is at about 9 volts going towards zero when the control logic 201 issues the SCR test pulse.

The self test cycle repeats based on the period of the self test timer 207.

Self testing the SCR 110 near the end of the positive half cycle of the AC line voltage before zero crossing provides advantages heretofore unrealized. For one, this allows for testing of the SCR 110, a critical component of the GFCI 100, without energizing the solenoid 105 and unexpectedly disrupting power to the load 102.

Secondly, as shown in FIGS. 3 and 4, the inductance of the solenoid 105 and the capacitance of the capacitor C6 do not result in large ringing when the SCR 110 is self tested near the end of the positive half cycle of the AC line voltage. This is due to the relatively small inductor current and the fact that no negative voltage is generated during the SCR self test. These allow the GFCI 100 to be fabricated without having to incorporate relatively complicated circuitry (e.g., microprocessors) and snubber circuits, which not only waste energy and increase cost but also require critical timing.

The normal operation (as opposed to self testing) of the GFCI 100 is now further discussed with reference to FIGS. 1 and 2.

In one embodiment, the sense coil 103 comprises a toroidal core made of solid ferrite material having 1000 turns for the secondary. The primary of the sense coil 103 is one turn made by passing the AC line hot and line neutral wires through the center of the toroid.

In the event of a ground fault, a difference will exist between electrical currents flowing through the line hot and line neutral wires. The difference primary current, divided by the number of secondary turns, flows through the secondary wire of the sense coil 103 as a secondary fault current. The secondary fault current flows through the feedback circuit 250 of the amplifier A1. The feedback circuit 250 creates a full wave rectified version of the secondary fault current. The secondary fault current passes through the AMP_OUT pin to the external resistor RSET to ground, generating a ground fault detect voltage equal to the resistor RSET times the peak secondary fault current divided by the sense coil 103 turns ratio. The comparator 251 compares the ground fault detect voltage to an internal reference voltage from the regulator 202. If the peak output voltage of the amplifier A1 pin exceeds the reference voltage, the comparator 251 starts a charging current into the DELAY pin by way of the time filter 251 to charge the capacitor C8. When the voltage across the capacitor C8 exceeds an internal reference voltage in the time filter 205, the time filter 205 generates a logical HIGH, which is latched and output by the SCR latch 206 on the SCR_OUT pin to turn ON the SCR 110. Turning ON the SCR 110 in turn energizes the solenoid 105 to open the switches S1-S4.

Circuits, components, and methods for ground fault circuit interrupters have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing a self test of a ground fault interrupter circuit (GFCI), the method comprising:
  detecting a positive half cycle of an AC (alternating current) line voltage coupled by the GFCI to a load;
  while the AC line voltage is in its positive half cycle, initiating a self test by turning ON a silicon controlled rectifier (SCR) that is configured to control a solenoid, the solenoid being configured to control switching of a plurality of load contacts coupling the AC line voltage to the load, the SCR being turned ON during the self test without energizing the solenoid to open the load contacts and without causing load power loss; and
  detecting a voltage of the SCR after it is turned ON during the self test to determine if the SCR is working properly.

2. The method of claim 1 wherein the voltage of the SCR comprises an anode voltage of the SCR.

3. The method of claim 1 wherein the SCR is turned ON when the AC line voltage is between 10V and zero.

4. The method of claim 1 further comprising:
   while the AC line voltage is in its positive half cycle, automatically testing functionality of a sense coil configured to monitor current flow through the GFCI to detect the ground fault during normal operation.

5. The method of claim 4 wherein the functionality of the sense coil is automatically tested by mutually coupling the sense coil to a neutral coil to induce and detect oscillation in an amplifier.

6. The method of claim 1 wherein detecting the voltage of the SCR after it is turned ON during the self test to determine if the SCR is working properly comprises:
   determining if the SCR has discharged below a predetermined threshold voltage; and
   deeming the SCR in working order if it has discharged below the predetermined threshold voltage.

7. The method of claim 6 wherein the predetermined threshold voltage is 30 volts.

8. A ground fault circuit interrupter (GFCI) comprising:
   a plurality of switches coupling an AC line voltage to a load through the GFCI;
   a sense coil configured to monitor current flow through the GFCI to generate sensed current information;
   a solenoid configured to control opening of the switches;
   a silicon controlled rectifier (SCR) configured to control operation of the solenoid to open the switches in an event of a ground fault; and
   a GFCI controller configured to process the current sensed information to detect the ground fault during normal operation and to test functionality of the SCR without energizing the solenoid to open the switches during a self test, the GFCI controller being configured to initiate the self test during positive half cycle of the AC line voltage.

9. The GFCI of claim 8 wherein the GFCI controller performs the self test when the AC line voltage is between 10V and zero.

10. The GFCI of claim 8 wherein the GFCI controller tests functionality of the sense coil during the self test.

11. The GFCI of claim 10 further comprising a switch controllable by the GFCI controller, the switch being configured to mutually couple the sense coil to another coil to test functionality of the sense coil by causing oscillation in an amplifier.

12. The GFCI of claim 8 further comprising a time filter configured to filter out false indications of a ground fault by providing a time delay to a detect signal.

13. The GFCI of claim 8 wherein the GFCI controller includes a self test timer configured to set a period for performing the self test.

14. A method of performing a self test of a ground fault circuit interrupter (GFCI), the method comprising:
   initiating the self test when an AC line voltage is in a positive half cycle, the self test including activation of a component of the GFCI configured to control switching of a plurality of load contacts, the load contacts coupling the AC line voltage to a load, the self test being performed without opening the load contacts.

15. The method of claim 14 wherein the component of the GFCI comprises a silicon controlled rectifier (SCR), the SCR being configured to energize a coil and open the load contacts upon occurrence of the ground fault during normal operation.

16. The method of claim 14 further comprising:
   testing a sense coil of the GFCI as part of the self test, the sense coil being configured to monitor current flow through the GFCI.

17. The method of claim 16 wherein testing the sense coil of the GFCI comprises:
   mutually coupling the sense coil to another coil; and
   detecting oscillation caused by the mutual coupling of the sense coil and the other coil.

18. The method of claim 14 wherein the self test is initiated when the AC line voltage is between 10V and zero.

19. The method of claim 14 wherein the component of the GFCI comprises an SCR and the SCR is deemed in proper working order when its anode voltage discharges below a predetermined voltage during the self test.

20. The method of claim 14 wherein the component of the GFCI comprises an SCR and the SCR is deemed in proper working order when its anode voltage discharges below 30V during the self test.

* * * * *